United States Patent [19]
Stewart et al.

[11] Patent Number: 6,136,944
[45] Date of Patent: Oct. 24, 2000

[54] ADHESIVE OF EPOXY RESIN, AMINE-TERMINATED POLYAMIDE AND POLYAMINE

[75] Inventors: Steven Lee Stewart; Derek Scott Kincaid, both of Houston, Tex.

[73] Assignee: Shell Oil Company, Houston, Tex.

[21] Appl. No.: 09/449,870

[22] Filed: Nov. 29, 1999

Related U.S. Application Data

[63] Continuation of application No. 09/157,489, Sep. 21, 1998, abandoned.

[51] Int. Cl.$^7$ .......................... C08G 59/60; C08K 03/26; C08K 03/36; C08L 63/02; C08L 77/08
[52] U.S. Cl. .......................... 528/120; 523/457; 523/466; 523/467; 525/113; 525/420.5; 525/423; 525/476; 528/339.3; 528/339.5; 528/341
[58] Field of Search .................................. 523/210, 215, 523/217, 455, 461, 488, 457, 466, 467; 525/420, 420.5, 423, 504, 533, 113, 476; 528/94, 111.3, 118, 120, 339.3, 339.5, 341

[56] References Cited

U.S. PATENT DOCUMENTS

| | | | |
|---|---|---|---|
| 3,655,595 | 4/1972 | Higashi et al. | 260/18 |
| 4,070,225 | 1/1978 | Batdorf | 156/330 |
| 4,082,708 | 4/1978 | Mehta | 260/18 N |
| 4,086,197 | 4/1978 | Bouche et al. | 260/18 |
| 4,115,296 | 9/1978 | Andrews | 528/92 |
| 4,188,221 | 2/1980 | Nanpei et al. | 430/288 |
| 4,206,097 | 6/1980 | Drawert et al. | 260/18 |
| 4,268,656 | 5/1981 | Ray-Chaudhuri et al. | 528/103 |
| 4,332,711 | 6/1982 | Kooymans et al. | 523/402 |
| 4,362,847 | 12/1982 | Kooymans et al. | 525/172 |
| 4,569,971 | 2/1986 | Sasse et al. | 525/109 |
| 4,698,396 | 10/1987 | Drawert et al. | 525/420.5 |
| 4,717,746 | 1/1988 | Leoni et al. | 524/100 |
| 5,017,675 | 5/1991 | Marten et al. | 528/111 |
| 5,296,556 | 3/1994 | Frihart | 525/420.5 |
| 5,296,557 | 3/1994 | Frihart | 525/423 |
| 5,301,940 | 4/1994 | Seki et al. | 273/72 R |
| 5,319,004 | 6/1994 | Marten et al. | 523/404 |
| 5,385,986 | 1/1995 | Frihart et al. | 525/420.5 |
| 5,424,371 | 6/1995 | Frihart et al. | 525/420.5 |
| 5,428,083 | 6/1995 | Smith et al. | 523/414 |
| 5,576,416 | 11/1996 | Walker | 528/340 |
| 5,605,944 | 2/1997 | Heebner | 523/404 |
| 5,612,448 | 3/1997 | Frihart | 528/339.5 |
| 5,962,629 | 10/1999 | Corley et al. | 528/341 |
| 5,998,508 | 7/1999 | Corley et al. | 523/414 |

FOREIGN PATENT DOCUMENTS

| | | |
|---|---|---|
| 423577 | 10/1989 | European Pat. Off. . |
| 60-48081 | 12/1976 | Japan . |
| 60-219281 | 4/1984 | Japan . |
| 61-73734 | 9/1984 | Japan . |
| 61-162564 | 1/1985 | Japan . |
| 63-29979 | 11/1994 | Japan . |

*Primary Examiner*—Robert E. L. Sellers
*Attorney, Agent, or Firm*—Donna Blalock Holguin; Yung-Yi Grace Tsang

[57] ABSTRACT

The present invention relates to a flexible industrial adhesive composition which effectively bonds thermoplastic polymer substrates and substrates having low stiffness such as fabric, rubbers and asphaltic materials, to materials selected from metals, fabrics, rubbers, engineered materials, and concrete, said flexible industrial adhesive composition comprising:

(a) one or more epoxy resin(s) having an average of at least 1.5 epoxy groups per molecule;

(b) a liquid amine terminated polyamide prepared by reacting at least one $C_{18\text{-}50}$ dicarboxylic acid and an aminoalkylpiperazine in a ratio of moles of aminoalkylpiperazine to equivalents of carboxyl group in the acid of greater than 0.75:1;

(c) one or more optional polyamine(s); and (d) one or more optional filler(s);

wherein the tensile modulus of the flexible industrial adhesive composition is less than 500,000 psi and the tensile elongation of the flexible industrial adhesive composition is greater than 10%. The flexible industrial adhesive compositions of the present invention can be used in industrial assembly and automotive/aerospace/transportation (buses, railroads).

15 Claims, No Drawings

ADHESIVE OF EPOXY RESIN, AMINE-TERMINATED POLYAMIDE AND POLYAMINE

This is a continuation of application Ser. No. 09/157,489 filed Sep. 21, 1998, abandoned, the entire disclosure of which is hereby incorporated by reference.

FIELD OF THE INVENTION

The present invention relates to flexible industrial adhesive compositions comprising one or more epoxy resin(s), a liquid amine terminated polyamine, one or more optional polyamine(s) and one or more optional filler(s).

BACKGROUND OF THE INVENTION

In industrial assembly and automotive/aerospace/bus and railroad transportation systems, industrial adhesives are frequently used for bonding a variety of materials together such as metals, fabrics, rubbers, plastics, composites, thermoplastics, wood, ceramics and concrete.

Typically, these industrial adhesives have comprised either urethanes with fillers or silicones with fillers. The urethane adhesives, although possessing moderate flexibility and intermediate strength, have been found to deteriorate after a period of exposure to light, heat and moisture. The silicon adhesives, while possessing high flexibility and extreme temperature resistance, have low strength as adhesives and are expensive.

Epoxy resins have also found wide spread use as adhesives. Typically, these epoxy resin adhesives provide a high strength rigid adhesive that bonds well to most substrates. However, the known epoxy resins have had difficulty consistently binding thermoplastic polymers to themselves and a variety of other materials.

Accordingly, it is desirable to provide an industrial adhesive that has great flexibility, high ductility and effectively bonds thermoplastic polymer substrates and substrates having low stiffness to different or like materials.

SUMMARY OF THE INVENTION

The present invention relates to a flexible industrial adhesive composition which effectively bonds thermoplastic polymer substrates and substrates having low stiffness such as fabric, rubbers and asphaltic materials to materials selected from metals, fabrics, rubbers, engineered materials, and concrete, said flexible industrial adhesive composition comprising:

(a) one or more epoxy resin(s) having an average of at least 1.5 epoxy groups per molecule;

(b) a liquid amine-terminated polyamine prepared by reacting at least one $C_{18-50}$ dicarboxylic acid and an aminoalkylpiperazine in a ratio of moles of aminoalkylpiperazine to equivalents of carboxyl group in the acid of greater than 0.75:1;

(c) one or more optional polyamine(s); and (d) one or more optional filler(s);

wherein the tensile modulus of the flexible industrial adhesive composition is less than 500,000 psi and the tensile elongation of the flexible industrial adhesive composition is greater than 10%.

The flexible industrial adhesive compositions of the present invention can be used in industrial assembly and automotive/aerospace/transportation (buses, railroads) uses thereby allowing the bonding of thermoplastic polymer substrates and substrates having low stiffness such as fabric, rubbers, and asphaltic materials to similar or dissimilar materials. The flexible industrial adhesives of the present invention have high adhesive strength combining high flexibility with resistance to heat and water degradation.

DETAILED DESCRIPTION OF THE INVENTION

The flexible industrial adhesive compositions of the present invention effectively bond thermoplastic polymer substrates and substrates having low stiffness such as fabric, rubbers and asphaltic materials to a variety of similar and dissimilar materials selected from fabric, rubbers, metals, concrete and engineered materials (such as metal assemblies, asphaltic materials, composites, thermoplastics, wood constructions, ceramics, modified bitumen and glass).

As used herein, the term "engineered materials" refers to man-made (synthetic) constructions of multiple components that mechanically can be treated as a single material. Examples of such materials include metal assemblies, asphaltic materials, composites, thermoplastics, wood constructions, ceramics, modified bitumen and glass.

As used herein, the term "industrial assembly" refers to the manufacture of sub-components or final constructions from their component parts.

The flexible industrial adhesives of the present invention are useful in industrial assembly and automotive/aerospace/transportation (buses, railroads) uses. The flexible industrial adhesive compositions of the present invention are effective for hemming flanges, glass sealants/mounting; stiffening spiders (hoods, trucks); sound deadening panels (doors) and adhering joints.

The flexible industrial adhesive composition of the present invention comprises:

(a) one or more epoxy resin(s) having an average of at least 1.5 epoxy groups per molecule;

(b) a liquid amine terminated polyamine prepared by reacting at least one $C_{18-50}$ dicarboxylic acid and an aminoalkylpiperazine in a ratio of moles of aminoalkylpiperazine to equivalents of carboxyl group in the acid of greater than 0.75:1;

(c) one or more optional polyamine(s); and (d) one or more optional filler(s);

wherein the tensile modulus of the flexible industrial adhesive composition is less than 500,000 psi and the tensile elongation of the flexible industrial adhesive composition is greater than 10%.

The tensile modulus of the flexible industrial adhesive composition is less than 500,000 psi. Further, the cured product has good tensile elongation at a value of generally above about 10%, often above about 25%, especially from about 25% to about 400%.

The aminoalkylpiperazine-basedamine terminated polyamine used can be produced by reacting long-chain dicarboxylic acids such as dimerized fatty acids ("dimer acids") or adducts of acrylic and methacrylic acid with unsaturated fatty acids ("adduct acids") with aminoalkylpiperazines under conditions effective to produce a liquid amine terminated polyamine. The resultant polyamines have a number-average amine hydrogen functionality of above 1.7 and up to 4. Preferably, the polyamide has an amine plus acid number greater than about 250 and has an excess of amine groups over acid groups.

The aminoalkylpiperazine-basedamine terminated polyamine may be prepared by thermal condensation of the aminoalkylpiperazine, preferably in excess, with one or more long-chain dicarboxylic acids or their esters under conditions effective to produce a liquid aminoalkylpiperazine-basedamine terminated polyamine. Generally the reaction is carried out at a temperature gradually climbing to a level of above about 200° C., preferably at a final temperature within the range of from about 220° C. to about 260° C. for a time effective to produce a liquid reaction product, followed by distillation, preferably under vacuum, to remove excess unreacted amine, as well as water and/or alcohol reaction product. (The water or alcohol reaction product generally distills at atmospheric pressure before vacuum is applied.) The term "liquid" refers to compositions which have a melting point, or ring and ball softening point (ASTM E28-67) of below room temperature (typically 25° C.). These liquid aminoalkylpiperazine-based amine terminated polyamines are low molecular weight oligomers, typically having number average molecular weight within the range from about 400 to about 3000, preferably from about 700 to about 2000. Alternatively, the amine may be reacted with a chloride of the dicarboxylic acid, but this synthetic procedure is less desirable because of the byproducts produced and the cost of the acid chlorides.

Preferably the long-chain dicarboxylic acid is a dicarboxylic acid having from 18 to 50 carbon atoms. More preferably, the long-chain dicarboxylic acid has from 30 to 40 carbon atoms.

As used herein, "dimer acids" refers to polymeric or oligomeric fatty acids typically made from addition polymerization, using heat and a catalyst, of unsaturated fatty acids, particularly tall oil fatty acids. These polymeric fatty acids typically have the composition of up to about 20% of $C_{18}$ monobasic acids, about 45 to 95% of $C_{36}$ dibasic acids, and about 1 to 35% of $C_{54}$ tribasic and higher polymeric acids. The relative ratios of monomer, dimer, trimer and higher polymer in unfractionated dimer acid are dependent on the nature of the starting material and the conditions of polymerization and distillation. Methods for the polymerization of unsaturated fatty acids are described, for example, in U.S. Pat. No. 3,157,681.

Examples of the "adduct acids" include adducts of acrylic acid, methacrylic acid, crotonic acid, etc. with linoleic acid, soybean oil fatty acid, tall oil fatty acid, etc. These adducts are normally prepared by thermal reaction at temperatures ≧200° C. Methods for the preparation of these adduct acids are described, for example, in U.S. Pat. No. 3,753,968.

Aminoalkylpiperazines can be represented by the following formula:

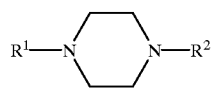

(I)

where $R^1$ and $R^2$ are each independently —H or —$R^3$—$NH_2$, wherein $R^3$ is a divalent aliphatic linkage, preferably a chain of —$CH_2$— units with optional —$CHR^4$— or $CR^4R^5$— units, wherein $R^4$ and $R^5$ are independently alkyl groups, provided that at least one of $R^1$ and $R^2$ are —$R^3$—$NH_2$—. The divalent aliphatic linkage preferably have 2 to 6 carbon atoms. In one embodiment of the present invention, $R^1$ is preferably —H and $R^2$ is —H or —$R^3$—$NH_2$, wherein $R^3$ is a divalent aliphatic linkage, preferably a chain of —$CH_2$— units with optional —$CHR^4$— or $CR^4R^5$— units, wherein $R^4$ and $R^5$ are independently alkyl groups, provided that at least one of $R^1$ and $R^2$ are —$R^3$—$NH_2$—.

Examples of the aminoalkylpiperazine include N-(2-aminoethyl)piperazine, N,N'-bis(2-aminoethyl)piperazine and N,N'-bis(3-aminopropyl)piperazine. N-(2-aminoethyl)piperazine and N,N'-bis(2-aminoethyl)piperazine are typical byproducts of the commercial production of ethylene amines from ammonia and ethylene oxide or ethylene dichloride. N,N'-bis(3-aminopropyl)piperazine is prepared by reacting piperazine with acrylonitrile to form N,N'-bis(2-cyanoethyl)piperazine followed by hydrogenation of the nitrile groups to amine groups. Methods for the preparation of aminoalkylpiperazines are described, for example, in I. Ono, *Kagaku Keizai*, 26(6), pp. 20–27 (1979) and Q. Sun and C. Zhu, *Shanghai Diyi Yixueyuan Xuebao*, 12(3), pp. 178–182 (1985).

To produce a liquid amine terminated polyamide curing agent one uses a starting ratio of moles of aminoalkylpiperazine to equivalents of carboxyl group in the acid or acid mixture used of greater than 0.75:1, more preferably greater than 0.9:1, still more preferably greater than 1:1.

The amine terminated polyamine curing agent can also be prepared by reacting an aminoalkylpiperazine with one or more long-chain dicarboxylic acids and optionally one or more other dicarboxylic acids. Such other dicarboxylic acid can be any dicarboxylic acid having carbon numbers from 4 to 20, which can be a long-chain or not a long-chain dicarboxylic such as, for example, azelaic acid, sebacic acid and adipic acid. Preferably, the dicarboxylic acids are all long-chain dicarboxylic acids. A minor amount (up to about 25% of total carboxyl equivalents) of a monocarboxylic acid such as tall oil fatty acid may also be included as a chain terminator. To obtain the amine terminated polyamine curing agent useful for the invention, up to about 50% of the total carboxyl equivalents, a dicarboxylic acid which is not a long-chain dicarboxylic acid can be used depending on the intended use of the product.

The amine terminated polyamine curing agent is present in an amount effective to cure the epoxy resin. The mole ratio of the epoxy resin to liquid amine terminated polyamine curing agent is typically from about 3:1, preferably from about 2:1, to about 1:3, preferably to about 1:2. When (c) one or more optional polyamine(s) are included in the formulation, the molar amount of the amine terminated polyamine is reduced by the molar amount of the optional polyamine(s) to give the appropriate ratio.

As noted above, one or more polyamine(s) other than component (b) can also be included in the composition of the present invention. Examples of these polyamine(s) include diethylenetriamine, triethylenetetramine, isophoronediamine, m-xylenediamine and polyoxypropyleneamines. Preferably, the additional amines are polyoxypropyleneamines. When polyoxypropyleneamines are used, they are amines having repeating oxypropylene units of the formula:

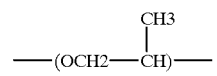

The structures are functionally terminated with primary amine groups positioned on secondary carbon atoms. Preferably the additional amine is an amine where the total amine concentration is low. Such amines are commercially available from Huntsman Chemicals as, JEFFAMINE® D-230, JEFFAMINE® D-400, JEFFAMINE® D-2000 and JEFFAMINE® T-403 which are represented by the formula:

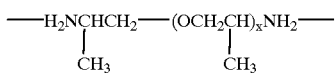

wherein x is 2.3 (JEFFAMINE® D-230) or 5.6 (JEFFAMINE® D-400) or 33.1 (JEFFAMINE® D-2000) or of the formula:

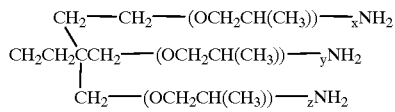

wherein x+y+z is approximately 5.3 (JEFFAMINE® T-403).

If a faster cure rate is desired, heat, a chemical accelerator or both may be added to speed the cure rate. Various amine-compatible accelerators can be used as long as they are soluble in the amine curing agents or epoxy resin. Examples of accelerators include metal salts such as, for example, sulfonates, phosphonates, sulfates, tetrafluoroborates, carboxylates and nitrates of Groups IA, IIA and transition metal series of the Periodic Table (CAS version), preferably Mg, Ca, Zn and Sn salts, and complexes thereof; inorganic acids such as, for example, $HBF_4$, $H_2SO_4$, $H_2NSO_3H$ and $H_3PO_4$; carboxylic acids, preferably hydroxy-substituted carboxylic acids such as, for example, salicylic, lactic, glycolic and resorcylic; phenolic compounds such as, for example, phenol, t-butylphenol, nonylphenol and bisphenol A; imidazoles; cyanamide compounds such as dicyandiamide and cyanamide; sulfonamides such as, for example p-toluenesulfonamide, methanesulfonamide, N-methylbenzenesulfonamide and sulfamide; imides such as, for example, phthalimide, succinimide, perylenetetracarboxylicdiimide and saccharin and tertiary amines such as benzyldimethylamine, dimethylamine ethane and tris(dimethylaminomethyl)phenol. Preferably, when included, the accelerator is selected from hydroxy substituted carboxylic acids, phenolic compounds and tertiary amines.

The accelerators are typically present in an amount of from about 0, preferably from about 0.1, weight percent to about 10 weight percent, preferably to 5 weight percent, based on the epoxy resin.

The one or more epoxy resin(s) can be any epoxy resin which can be cured by the amine terminated polyamine curing agent. Generally, the epoxy resin can be any curable epoxy resin having a 1,2-epoxy equivalency greater than one and preferably, on the average, more than about 1.5 epoxide groups per molecule. The epoxy resin can be saturated or unsaturated, linear or branched, aliphatic, cycloaliphatic, aromatic or heterocyclic, and may bear substituents which do not materially interfere with the curing reaction. Such substituents can include bromine. The epoxy resin may be monomeric or polymeric, liquid or solid, but is preferably liquid at room temperature. Suitable epoxy reins include glycidyl ethers prepared by reacting epichlorohydrin with a compound containing at least one, preferably two or more, hydroxyl groups carried out under alkaline reaction conditions. Examples of epoxy resins suitable for use in the invention include polyglycidyl ethers of polyhydric phenols, epoxy novolacs or similar glycidated polyphenolic resins, polyglycidyl ethers of glycols or polyglycols, and polyglycidyl esters of polycarboxylic acids.

The preferred epoxy resin(s) are resins based on a polyglycidyl ether of a polyhydric phenol. Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl) propane (bisphenol-A); 2,2-bis(4-hydroxy-3-tert-butylphenylpropane; 1,1-bis(4-hydroxyphenyl)ethane; 1,1-bis(4-hydroxyphenyl)isobutane; bis(2-hydroxy-1-naphthyl) methane; 1,5-dihydroxynaphthalene; 1,1-bis(4-hydroxy-3-alkylphenyl) ethane and the like. Suitable polyhydric phenols can also be obtained from the reaction of phenol with aldehydes such as formaldehyde (bisphenol-F). Fusion products of these polyglycidyl ethers of polyhydric phenols with phenolic compounds such as bisphenol-A are also suitable as epoxy resins, such as those describedin U.S. Pat. No. 3,477,990 and U.S. Pat. No. 4,734,468. Commercial examples of preferred epoxy resins include, for example, EPON® Resin 862, EPON® Resin 828, EPON® Resin 826, EPON® Resin 825 EPON® Resin 1001, EPON® Resin 155 and EPON® Resin HPT-1050, each available from Shell Chemical Company.

Additional epoxy resins that can be used include mono- or polyglycidyl ethers of aliphatic or cycloaliphatic alcohols and polyalcohols and phenols. Aliphatic glycidyl ethers can be produced, for example, by reacting an epihalohydrin with an aliphatic diol (optionally containing ether linkages or sulfone linkages) in the presence of a Lewis acid catalyst followed by conversion of the halohydrin intermediate to the glycidyl ether by reaction with sodium hydroxide. Aromatic glycidyl ethers can be produced, for example, by reacting an epihalohydrin with a monohydric phenol in the presence of an alkali. Commercial examples of preferred epoxy resins include, for example, HELOXY® Modifier 68 (the diglycidyl ether of neopentyl glycol), HELOXY® Modifier 107 (the diglycidyl ether of 1,4-cyclohexanedimethanol), HELOXY® Modifier 61 (a butyl glycidyl ether), HELOXY® Modifier 62 (a cresyl glycidyl ether) and HELOXY® Modifier 9 (alkyl $C_{12}$–$C_{13}$glycidyl ethers), each available from Shell Chemical Company.

Examples of preferred aliphatic glycidyl ethers include those corresponding to the formulas:

(II)

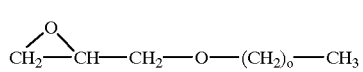

(III)

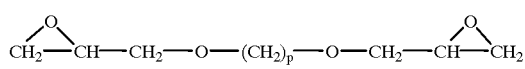

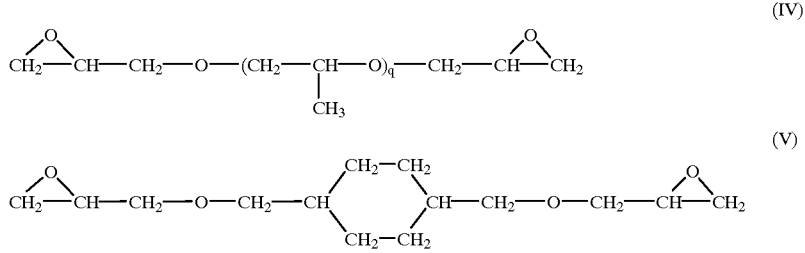

wherein:
o is an integer from 0 to 35, preferably from 3 to 13;
p is an integer from 2 to 12, preferably from 2 to 6; and
q is an integer from 4 to 24, preferably from 4 to 12.

Examples of suitable aliphatic glycidyl ethers include, for example, diglycidyl ethers of 1,4 butanediol, neopentyl glycol, cyclohexanedimethanol, hexanediol, hydrogenated bisphenol A, and polypropylene glycol; triglycidyl ethers of trimethylolethane and trimethylolpropane and caster oil glycidyl ether (HELOXY® Modifier 505).

In addition to the above epoxy resins, glycidyl esters of aliphatic, cycloakiphatic and aromatic acids may be used. The glycidyl esters can be produced by any methods known in the art. The glycidyl esters can be produced, for example, by reacting the aliphatic, cycloaliphatic or aromatic acids with epichlorohydrin and alkali metal hydroxides. Commercial examples include HELOXY® Modifier 10 (glycidyl ester of neodecanoic acid), HELOXY® Modifier 71 (dimer acid diglycidyl ester) and EPON® Resin A-100 (diglycidyl ester of hexahydrophthalate anhydride), each available from Shell Chemical Company.

One or more optional filler(s) can also be included in the present invention. Examples of suitable fillers include minerals or polymers or mixtures thereof. Typical mineral fillers include silica, mica, ground limestone, talc, gypsum, clays, etc. Typical polymeric fillers include thermosetting rubbers (such as neoprenes), rubber particle fillers (Kraton® Rubber particles, chloroprenes, EPDM, urethanes, etc.) and liquid rubbers (CTBN, EKP, silicon rubbers); flexibilizing resins; plasticizers; hydrocarbon resins (such as rosen, low molecular weight polyethylenes and polypropylenes; and coal tar (Modpox®). The preferred mineral fillers are silica, ground limestone, and clays. The preferred polymeric fillers are the thermosetting rubbers, liquid rubbers and coal tar.

The one or more optional filler(s) of the present invention are present in a final amount from 0 to 80% by volume based on the final composition. When included, preferably the one or more optional filler(s) will be present in a final amount from 20% to 80% by volume based on the final composition, more preferably in an amount from 50% to 80% by volume based on the final composition.

In one embodiment of the present invention, one or more epoxy resin(s), a curing agent containing the amine terminated polyamine, and/or optionally an accelerator and/or one or more filler(s) is included. A second embodiment of the present invention contains one or more epoxy resin(s), a curing agent containing the amine terminated polyamine, one or more additional polyamine(s), and/or one or more filler(s) and/or optionally an accelerator.

The epoxy resin can be blended or mixed with the curing agent containing the amine terminated polyamine and optionally the one or more additional polyamine(s), one or more filler(s) and accelerator simultaneously or in any order at a temperature below the cure temperature which is typically below about 100° C.

When one or more additional polyamine(s) are included in the composition, the composition can be prepared by preblending the one or more additional amine(s) with the liquid amine terminated polyamine component. In the alternative, as noted, the one or more additional polyamine (s) are added with the other components and mixed at one time.

When fillers are included in the composition, the composition can be prepared by preblending the filler(s) with either the epoxy resin component or the liquid amine terminated polyamine component. The filler blended components are then mixed within a short time prior to use. In an alternative embodiment, the filler(s) are mixed with both the epoxy resin and the liquid amine terminated polyamine. These mixtures may be held for the entire shelf life of the epoxy resin or liquid amine terminated polyamine.

In still another embodiment, all of the components are mixed at one time. The manner in which the formulation is mixed is not critical. The ingredients may be added all at once or one at a time. Preferably, when fillers are included one half of each filler is mixed with the epoxy resin and the other half is mixed with the curing agent in order to keep the same viscosity. This simply allows for convenience with regard to better and easier mixing.

The components may be mixed by hand or by using any known mechanical apparatus which is commonly used in the industry. Preferably, in order to assure complete mixing, a mechanical apparatus such as a Cowles disperser, Hockmeier mixer or Ross Double Plantetary, is used.

Further to facilitate handling or application or use in various environments, the curing agent or the epoxy resin system can be diluted with minor amounts of aliphatic, aromatic or cycloaliphatic ketones or esters or aromatic solvents.

The curable epoxy resin composition can be cured at a temperature within the range of from about −40° C., preferably from about −10° C., to about 100° C., preferably to about 75° C., for a time effective to cure the epoxy resin. In the more preferred embodiments, the flexible industrial adhesive composition can be cured at a temperature from about 15° C. to about 60° C. for a time effective the cure the epoxy resin. In many instances, the flexible industrial adhesive composition can be cured at ambient temperature for a time effective to cure the epoxy resin.

The epoxy resin composition of the invention may include other additives, such as flow control additives such as solvents or anti-sag agents, as well as other additives such as pigments, reinforcing agents, elastomers, stabilizers, extenders, plasticizers, and flame retardants.

The final composition, once mixed, may be applied by any conventional means including, but not limited to, caulk guns, mefer/mix equipment or trowels.

The present invention will be further demonstrated by the following examples which are included for illustrative purposes only and are in no way meant to limit the present invention.

EXAMPLES

Examples 1 and 2 demonstrate the aminoalkylpiperazine-basedamine terminated polyamine as curing agents. The dimer acid (~10% $C_{18}$ monobasic acids, ~80% $C_{36}$ dibasic acids, ~10% $C_{54}$ tribasic acids) was obtained from Shell Chemical Co. N-(2-aminoethyl)piperazine(AEP), commercially available from Union Carbide, was used. EPON® Resin 828 (a diglycidyl ether of bisphenol A having epoxy equivalent weight of 185–192), EPON® Resin 815 (a blend of EPON® Resin 828 and HELOXY® Modifier 61 having epoxy equivalent weight of 175–195), were obtained from Shell Chemical Company.

Example 1

"Dimer acid" with a Gardner viscosity of Z4 (carboxyl equivalent weight within the range of between approximately 280 and 290) from Shell Chemical Company (1225 grams 4.258-COOH equivalents) was mixed with 1130 grams of N-(2-aminoethyl)piperazine(AEP) at a reactant ratio of 2.05 moles amine/eq COOH in a round-bottom flask equipped with a heating mantle, a paddle stirrer, a thermocouple, a nitrogen purge, and a Vigreux column with a vacuum distillation takeoff. The system was purged with nitrogen and heating was started. Typically, when the pot temperature had reached 150–170° C., water began to distill at atmospheric pressure. Water distillation at atmospheric pressure continued until the pot temperature had been raised to 220–240° C.; the pot was held at this temperature until water distillation had stopped or had essentially stopped. Vacuum was then applied and vacuum distillation of the amine was carried out until the pot temperature had risen back to 220–240° C. and the rate of amine offtake had become essentially negligible. Vacuum stripping was then continued at this temperature for approximately another 15 minutes. The product was then allowed to cool to about 150° C. under vacuum or under a stream of nitrogen and were then poured into jars. The products were characterized by amine nitrogen content (by titration) of 6.50% nitrogen by titration and viscosity of Ubbelohde kinematic viscosity 40° C. 28,800 mm²/sec.

Example 2

"Dimer acid" with a Gardner viscosity of Z4 (carboxyl equivalent weight within the range of between approximately 280 and 290) from Shell Chemical Company (655 grams 2.298-COOH equivalents) was mixed with 73 grams of tall oil fatty acid (carboxyl equivalent weight within the range of 288 and 300 from Georgia Pacific Company) and 672 grams of N-(2-aminoethyl)piperazine(AEP) at a reactant ratio of 2.04 moles amine/eq COOH in a 2-liter round-bottom flask equipped with a heating mantle, a paddle stirrer, a thermocouple, a nitrogen purge, and a Vigreux column with a vacuum distillation takeoff. The system was purged with nitrogen and heating was started. Typically, when the pot temperature had reached 150–170° C., water began to distill at atmospheric pressure. Water distillation at atmospheric pressure continued until the pot temperature had been raised to 220–240° C.; the pot was held at this temperature until water distillation had stopped. Vacuum was then applied and vacuum distillation of the amine was carried out until the pot temperature had risen back to 220–240° C. and the rate of amine offtake had become essentially negligible. Vacuum stripping was then continued at this temperature for approximately another 1 hour, vacuum is then recovered. The intermediate product (net 1011 grams) had a Garner color of 8–9, % titratible nitrogen 6.81%, amine value of 0.50 and a viscosity of 58,800 cPs. This intermediate product was then blended with 288.9 grams of a polyoxypropylenetriamine having a molecular weight of approximately 403 (commercially available as JEFFAMINE® D-400 from Huntsman Chemicals) and 144.4 grams of para-t-butyl phenol (commercially available from a variety of vendors) was then added to the resulting mixture. The product was mixed until the para tertiary butyl phenol had completely dissolved then allowed to cool to about 60° C. under a stream of nitrogen and were then poured into jars. The products were characterized by amine nitrogen content (by titration) of 5.57% nitrogen titration and viscosity of approximately 8,200 centipoise.

Flexible Industrial Adhesive Compositions

The following compositions were made using the curing agents set forth as Example 1 and Example 2 above. In each adhesive composition, the resin and curing agent were combined and mixed in a suitable vessel. After thorough mixing, the samples for mechanical testing were poured into molds where they were allowed to cure for 24 hours at 25° C. and then postcured for 2 hours at 100° C.

Each of the compositions was tested for Shear by Tension Loading (Lap Shear) using the procedure set forth in ASTM D 1002-72, incorporated herein by reference. Samples for adhesive test of lap shear were prepared using freshly solvent cleaned coupons. The coupons were 1" wide×4" long.

The adhesive compositions were mixed just prior to use and applied at room temperature. The adhesive compositions were applied to one side of the etched surface of two coupons with a tongue blade to approximately 0.010" thick. Two nylon monofilament spacers 0.015" inches thick were placed in the bonding area, parallel to the long dimension and equally spaced laterally. The coupons were assembled with a 0.50" lap and clamped with small binder clamps to maintain orientation during cure of 14 days at ° C.

Each of the compositions were tested for peel resistance using the procedure set forth in ASTM D 1876, incorporated herein by reference. Samples for peel strength were prepared using freshly solvent cleaned coupons. The coupons were 1" wide×12" long. The adhesive compositions were mixed just prior to use and applied at room temperature. The adhesive compositions were applied to one surface of two coupons with a tongue blade to approximately 0.005" thick. The coupons were assembled with the coated faces together and clamped with small binder clamps to maintain orientation during cure of 14 days at 25° C.

The data obtained is included in the table below.

| Composition (parts by weight) | 1 | 2 | 3 | 4 |
|---|---|---|---|---|
| EPON Resin 828 | 100 | | 100 | |
| EPON Resin 815 | | 100 | | 100 |
| Example 1 | 195 | 198 | | |
| Example 2 | | | 136 | 138 |
| Handling Properties at 25° C. | | | | |
| Resin Viscosity, cPs | 12,500 | 600 | 12,500 | 600 |
| Curing Agent Viscosity, cPs | 145,000 | 145,000 | 8,200 | 8,200 |
| Blend Viscosity, cPs | 92,000 | 30,500 | 8,400 | 3,900 |
| Gel Time, 100 grams, minutes | 45 | 53 | 49 | 82 |
| Mechanical Properties at 25° C.[1] | | | | |
| Tensile Strength, psi | 4,354 | 1,470 | 3,782 | 332 |
| Tensile Elongation at break, % | 169 | 240 | 189 | 260 |
| Tensile Modulus, psi | 218,000 | 8,112 | 213,000 | 168 |
| Tear Strength, lb./inch | 934 | 521 | 1017 | 153 |
| Taber Abrasion, mg loss/1000 cycles | 33 | 49 | 29 | 37 |
| Izod Impact, ft-lb/in notch | 0.9 | 14.2 | 14.4 | 12.8 |
| Shore "D" Hardness, | | | | |
| 24 Hrs | 66 | 38 | 24 | — |
| 2 Days | 68 | 43 | 52 | 6 |
| 7 Days | 72 | 57 | 72 | 42 |
| Lap Shear Strength, psi, | | | | |

-continued

| Composition (parts by weight) | 1 | 2 | 3 | 4 |
|---|---|---|---|---|
| ASTM D-1002: | | | | |
| Al-Al, 7 days ambient cure | 1160 | 1608 | 1002 | 951 |
| Al-Al, 16 hr amb + 2 hr @ 100° C. | 3068 | 2060 | 3003 | 932 |
| Oily Steel, 7 days ambient cure | 732 | 1303 | 653 | 843 |
| Oily Steel, 16 amb + 2 hr @ 100° C. | 2598 | 1854 | 2189 | 936 |
| Peel Strength,[2] Alum-Alum, lb/in | 14 | 9.4 | 8.8 | 9.5 |
| Water Resistance, | | | | |
| 24 hrs | 1.00 | 1.81 | 0.42 | 1.01 |
| 7 Days | 2.90 | 4.81 | 1.40 | 2.56 |

Compositions

| | | | | | | | | | |
|---|---|---|---|---|---|---|---|---|---|
| EPON Resin 828 | 100 | 100 | | | | | | | |
| EPON Resin 8132 | | | 100 | 100 | | | | | |
| EPON Resin 815 | | | | | 100 | 100 | | | |
| Example 1 | | | 178 | | | | | | |
| Example 2 | 136 | | | | 138 | | | | |
| Epi-Cure 3072 | | 34.6 | | | | | | | |
| Epi-Cure 3140 | | | | | | 51.4 | | | |
| Triethylene Tetramine | | | | 12 | | | | | |
| Scotch Grip 1300 | | | | | | | 100 | | |
| Mr. Latex Crack Filler | | | | | | | | 100 | |
| Silicone Advantage | | | | | | | | | 100 |

Lap Shear Strength - psi

| | | | | | | | | | |
|---|---|---|---|---|---|---|---|---|---|
| PET/Aluminum | 355 | 139 | | | 281 | 186 | | | |
| PET/PET | | | 239 | 55 | | | 170 | 19 | |
| PET/Glass | 416* | 158 | | | 297 | 175 | | | 31 |
| Cotton Duck/Steel | | | 36* | 42* | | | | | |
| Rubber/Rubber | 4 | 2.8 | | | 4.6 | 4.7 | 6.6 | | |
| Rubber/Steel | | | 9.2 | — | | | 8.4 | | 6.2 |
| Burlap/Asphalt Shingle | 138* | 53* | | | 49 | 86* | | | |
| PET/Concrete | | | 189 | 103 | | | | 61 | |
| Cotton Duck/Concrete | * | 31* | | | 62* | 29* | | | |
| Rubber/Concrete | | | 3.2 | — | | | 6.4 | 3.5 | — |

Peel Strength - pounds/inch width

| | | | | | | | | | |
|---|---|---|---|---|---|---|---|---|---|
| PET/Aluminum | 0.03 | — | | | 0.21 | 0.05 | | | |
| PET/PET | | | 2.09 | 0.04 | | | 1.65 | 0.37 | |
| PET/Glass | 0.16 | 0.05 | | | 0.80 | 0.05 | | | — |
| Cotton Duck/Steel | | | 5.46 | — | | | | | |
| Rubber/Rubber | 0.13 | 0.23 | | | 0.13 | 0.12 | 0.13 | | |
| Rubber/Steel | | | 0.31 | 0.04 | | | 0.02 | | — |
| Burlap/Asphalt Shingle | 0.54 | 0.43 | | | 1.43 | 0.61 | | | |
| PET/Concrete | | | 6.91 | — | | | | — | |
| Cotton Duck/Concrete | 0.011 | 0.006 | | | 11.1 | — | | | |
| Rubber/Concrete | | | 0.17 | 0.02 | | | 0.07 | — | 0.02 |

\* = coupon failed during test before adhesive failure
— = adhesive failed before it could be tested

Materials used

| | |
|---|---|
| Aluminum | T-2024 alloy, 0.030" thick |
| Steel | General Motors plate steel, 0.030" thick |
| PET | Mylar Film, 10 mils |
| Shingle | Owens-Corning "Oakridge II" Asphalt/Fibreglass |
| Concrete | James Hardie "HARDIBACKER" Ceramic Tile Underlay 1/4" |
| Rubber | Coltec Industries: Garlock Rubber Technologies Style 135 Floating Gum (1/8" Pure Gum Rubber) |
| Epi-Cure 3072 | Shell Chemical Company - Accelerated Amidoamine designed for adhesives |
| Epi-Cure 3140 | Shell Chemical Company - Polyamide widely used for adhesives |
| Triethylene Tetramine | Common aliphatic amine curing agent |
| SG-1300 | 3M Scoth-Grip 1300 Rubber & Gasket Adhesive |
| MD LCF | Macklanbug-Duncan "Mr. Mac's Latex Crack Filler" |
| GE SASR | General Electric Corporation GE Silicones "Silicone ADVANTAGE Silicone Rubber" |

What is claimed is:

1. A flexible industrial adhesive composition which bonds thermoplastic polymer substrates and substrates having low stiffness, to materials selected from the group consisting of metals, fabrics, rubbers, engineered materials and concrete, said flexible industrial adhesive composition comprising:

(a) one or more epoxy resin(s) having an average of at least 1.5 epoxy groups per molecule;

(b) a liquid amine terminated polyamide prepared by reacting at least one $C_{18-50}$ dicarboxylic acid or dicarboxylic acid halide with an aminoalkylpiperazine in a ratio of moles of aminoalkylpiperaze to equivalents of carboxyl group in the acid of greater than 0.75:1; wherein the aminoalkylpiperazine is of the formula:

where $R^1$ is hydrogen and $R^2$ is —$R^3$—$NH_2$, wherein $R^3$ is a divalent aliphatic with optional —$CHR^4$— or —$CR^4R^5$— units, wherein $R^4$ and $R^5$ are independently alkyl groups;

(c) one or more polyamine(s); and (d) optionally one or more filler(s);

wherein the molar ratio of the epoxy resin to said liquid amine terminated polyamide is from about 3:1 to 1:3, the tensile modulus of the final composition is less than 500,000 psi and the tensile elongation of the final composition is greater than 10%.

2. The flexible industrial adhesive composition of claim 3 wherein the dicarboxylic acid is selected from the group consisting of adducts of acrylic and methacrylic acids with dimerized unsaturated fatty acids and unsaturated fatty acids other than said dimerized unsaturated fatty acids.

3. The flexible industrial adhesive composition of claim 1 wherein the dicarboxylic acid is a dimerized unsaturated fatty acid.

4. The flexible industrial adhesive composition of claim 1 wherein the liquid amine terminated polyamide component (b) is prepared by reacting, in a reaction mixture, (i) the $C_{18-50}$ dicarboxylic acid, (ii) at least one other dicarboxylic acid and (iii) the aminoalkylpiperazine.

5. The flexible industrial adhesive composition of claim 4 wherein the reaction mixture further comprises a monocarboxylic acid.

6. The flexible industrial adhesive composition of claim 2 wherein the one or more polyamine(s) (c) are selected from the group consisting of diethylenetriamine, triethylenetetramine, isophoronediamine, m-xylenediamine and polyoxypropyleneamines.

7. The flexible industrial adhesive composition of claim 1 further comprising an accelerator.

8. The flexible industrial adhesive composition of claim 6, wherein said one or more polyamine(s) are polyoxypropyleneamines having repeating oxypropylene units.

9. The flexible industrial adhesive composition of claim 8 further comprising an accelerator.

10. The flexible industrial adhesives of claim 9 wherein the filler(s) are selected from the group consisting of (a) mineral, (b) polymers selected from the group consisting of thermosetting rubbers, rubber particle fillers, liquid rubbers, flexibilizing resins, plasticizers, hydrocarbon resins other than said rubbers and coal tar, and (c) mixtures thereof.

11. The flexible industrial adhesive of claim 10 wherein the filler(s) are present in an amount from 50% to 80% by volume based on the final composition.

12. The flexible industrial adhesives of claim 4 wherein the filler(s) are selected from the group consisting of (a) mineral, (b) polymers selected from the group consisting of thermosetting rubbers, rubber particle fillers, liquid rubbers, flexibilizing resins, plasticizers, hydrocarbon resins other than said rubbers and coal tar, and (c) mixtures thereof.

13. The flexible industrial adhesive of claim 12 wherein the filler(s) are present in an amount from about 50% to 80% by volume based on the final composition.

14. The flexible industrial adhesive of claim 11 wherein the filler(s) are polymers selected from the group consisting of silica, mica, ground limestone, talc, gypsum and clays.

15. The flexible industrial adhesive of claim 11 wherein the filler(s) are polymers selected from the group consisting of thermosetting rubbers, rubber particle fillers, liquid rubbers, flexibilizing resins other than said rubbers, plasticizers, hydrocarbon resins and coal tar.

* * * * *